(12) United States Patent
Yu

(10) Patent No.: US 7,557,031 B2
(45) Date of Patent: Jul. 7, 2009

(54) ETCH BACK WITH ALUMINUM CMP FOR LCOS DEVICES

(75) Inventor: Chris C. Yu, Shanghai (CN)

(73) Assignee: Semiconductor Manufacturing International (Shanghai) Corporation, Shanghai (CN)

(*) Notice: Subject to any disclaimer, the term of this patent is extended or adjusted under 35 U.S.C. 154(b) by 212 days.

(21) Appl. No.: 11/388,359

(22) Filed: Mar. 23, 2006

(65) Prior Publication Data

US 2007/0026634 A1    Feb. 1, 2007

Related U.S. Application Data

(63) Continuation of application No. 11/191,462, filed on Jul. 27, 2005, now abandoned.

(30) Foreign Application Priority Data

Sep. 15, 2004    (CN) .......................... 200410066515

(51) Int. Cl.
*H01L 21/4763* (2006.01)
(52) U.S. Cl. ...................... 438/626; 438/427
(58) Field of Classification Search ................. 438/626
See application file for complete search history.

(56) References Cited

U.S. PATENT DOCUMENTS

| 5,461,501 | A | 10/1995 | Sato et al. |
| 6,143,671 | A | 11/2000 | Sugai |
| 6,472,306 | B1 | 10/2002 | Lee et al. |
| 6,576,550 | B1 | 6/2003 | Brase et al. |
| 2003/0143768 | A1 | 7/2003 | Chen et al. |
| 2004/0115923 | A1 | 6/2004 | Macneil |
| 2004/0253809 | A1* | 12/2004 | Yao et al. .................... 438/631 |
| 2005/0007323 | A1 | 1/2005 | Appelbaum et al. |

* cited by examiner

*Primary Examiner*—Thao X Le
*Assistant Examiner*—Kimberly Trice
(74) *Attorney, Agent, or Firm*—Townsend and Townsend and Crew LLP

(57) ABSTRACT

A method for manufacturing an LCOS device includes forming an interlayer dielectric layer overlying a surface region of a substrate. The interlayer dielectric layer is patterned to form a plurality of recessed regions. Each of the recessed regions corresponds to a pixel element for a LCOS device and is isolated by a portion of dielectric material defining a border for each of the recessed regions. An aluminum material or aluminum alloy material is deposited within each of the recessed regions. A photomask is formed overlying the aluminum material and patterned to expose the recessed regions while protecting the border regions. Exposed regions of the aluminum material is removed while the border regions with the photomask is protected. The method continues the removing until the aluminum material has been removed to a vicinity of an upper region of the border regions. The patterned photomask is stripped to expose protruding aluminum material.

20 Claims, 3 Drawing Sheets

ETCH BACK WITH ALUMINUM CMP FOR LCOS DEVICES

CROSS-REFERENCES TO RELATED APPLICATIONS

This Continuation Application claims priority to Chinese Application No. 200410066515.8; filed Aug. 15, 2004 and U.S. patent application Ser. No. 11/191,462; filed Jul. 27, 2005 commonly assigned, and of which is incorporated by reference for all purposes.

BACKGROUND OF THE INVENTION

The present invention is directed to integrated circuits and their processing for the manufacture of electronic devices. More particularly, the invention provides a method for manufacturing an electrode structure for a liquid crystal on silicon ("LCOS") device for displays. But it would be recognized that the invention has a much broader range of applicability.

Electronic display technologies have rapidly developed over the years. From the early days, cathode ray tube technology, commonly called CRTs, outputted selected pixel elements onto a glass screen in conventional television sets. These television sets originally output black and white moving pictures. Color television sets soon replaced most if not all black and white television units. Although very successful, CRTs were often bulky, difficult to make larger, and had other limitations.

CRTs were soon replaced, at least in part, with liquid crystal panel displays. These liquid crystal panel displays commonly called LCDs used an array of transistor elements coupled to a liquid crystal material and color filter to output moving pictures in color. Many computer terminals and smaller display devices often relied upon LCDs to output video, text, and other visual features. Unfortunately, liquid crystal panels often had low yields and were difficult to scale up to larger sizes. These LCDs were often unsuitable for larger displays often required for television sets and the like.

Accordingly, projection display units have been developed. These projection display units include, among others, a counterpart liquid crystal display, which outputs light from selected pixel elements through a lens to a larger display to create moving pictures, text, and other visual images. Another technology is called "Digital Light Processing" (DLP), which is a commercial name from Texas Instruments Incorporated (TI) of Texas, USA. DLP is often referred to as the use of "micro-mirrors." DLP relies upon a few hundred thousand tiny mirrors, which line up in 800 rows of 600 mirrors each. Each of the mirrors is hinged. An actuator is attached to each of the hinges. The actuator is often electrostatic energy that can tilt each of the mirrors at high frequency. The moving mirrors can modulate light, which can be transmitted through a lens and then displayed on a screen. Although DLP has been successful, it is often difficult to manufacture and subject to low yields, etc.

Yet another technique is called LCOS. LCOS uses liquid crystals applied to a reflective mirror substrate. As the liquid crystals "open" or "close," light is reflected or blocked, which modulates the light to create an image for display. Compared to the conventional transmissive LCD, a reflective LCOS display allows more light to be passed through the optics and therefore it provides a higher luminance. Often times, there are at least three LCOS chips, each corresponding to light in red, green, and blue channels. LCOS, however, has many limitations. As merely an example, LCOS is often difficult to manufacture. Additionally, LCOS requires at least the three chips that make the projector bulky and heavy and leads to high costs.

Conventional reactive ion etch (RIE) is used to pattern aluminum film and form aluminum mirrors. This conventional process flow has a number of drawbacks. Due the non-uniformity in oxide deposition and etchback, it will result in non-uniformity between wafer center and edge. Additionally, surface defect level is often high using the conventional process. Such defects include pits, missing aluminum, and scratches. Surface roughness is also often high, typically equal or great than 20 Å in RMS, which limits reflectivity of AL mirrors. These and other limitations are described in more detail below.

From the above, it is seen that an improved technique for processing devices is desired.

BRIEF SUMMARY OF THE INVENTION

According to the present invention, techniques for processing integrated circuits for the manufacture of electronic devices are provided. More particularly, the invention provides a method for manufacturing an electrode structure for a liquid crystal on silicon ("LCOS") device for displays. But it would be recognized that the invention has a much broader range of applicability.

In a specific embodiment, the present invention provides a method for manufacturing an LCOS device. The method includes providing a substrate (e.g., silicon wafer) having a surface region. The method includes forming an interlayer dielectric layer overlying the surface region of the substrate. The method patterns the interlayer dielectric layer to form a plurality of recessed regions. Each of the recessed regions corresponds to a pixel element for a LCOS device. Each of the recessed regions is isolated by a portion of dielectric material defining a border for each of the recessed regions. Each of the border regions forming a peripheral region surrounding each recessed region. The method deposits an aluminum material within each of the recessed regions to fill each of the recessed regions and to cover exposed portions of the border regions. The method forms a photomask overlying the aluminum material and patterns the photomask to expose regions corresponding to the recessed regions and protects regions corresponding to the border regions. The method removes exposed regions of the aluminum material while protecting the regions corresponding to the border regions with the photomask. The method continues the removing until the aluminum material has been removed to a vicinity of an upper region of the border regions. Next, the method strips the patterned photomask to expose protruding aluminum material, which surrounds the patterned aluminum material. The method touch-up polishes the protruding aluminum material and portions of the patterned aluminum material while using the border regions as a polish stop to planarize an upper surface region formed by the border regions and the patterned aluminum material.

Many benefits are achieved by way of the present invention over conventional techniques. For example, the present technique provides an easy to use process that relies upon conventional technology. In some embodiments, the method provides higher device yields in dies per wafer. Additionally, the method provides a process that is compatible with conventional process technology without substantial modifications to conventional equipment and processes. Preferably, the invention provides for an improved mirror or electrode structure for LCOS devices used for displays. Such electrode structure uses a touch-up polishing technique that provides an improved mirror surface. Depending upon the embodiment, one or more of these benefits may be achieved. These and other benefits will be described in more throughout the present specification and more particularly below.

Various additional objects, features and advantages of the present invention can be more fully appreciated with reference to the detailed description and accompanying drawings that follow.

DETAILED DESCRIPTION OF THE INVENTION

According to the present invention, techniques for processing integrated circuits for the manufacture of electronic devices are provided. More particularly, the invention provides a method for manufacturing an electrode structure for a liquid crystal on silicon ("LCOS") device for displays. But it would be recognized that the invention has a much broader range of applicability.

Figure 1:
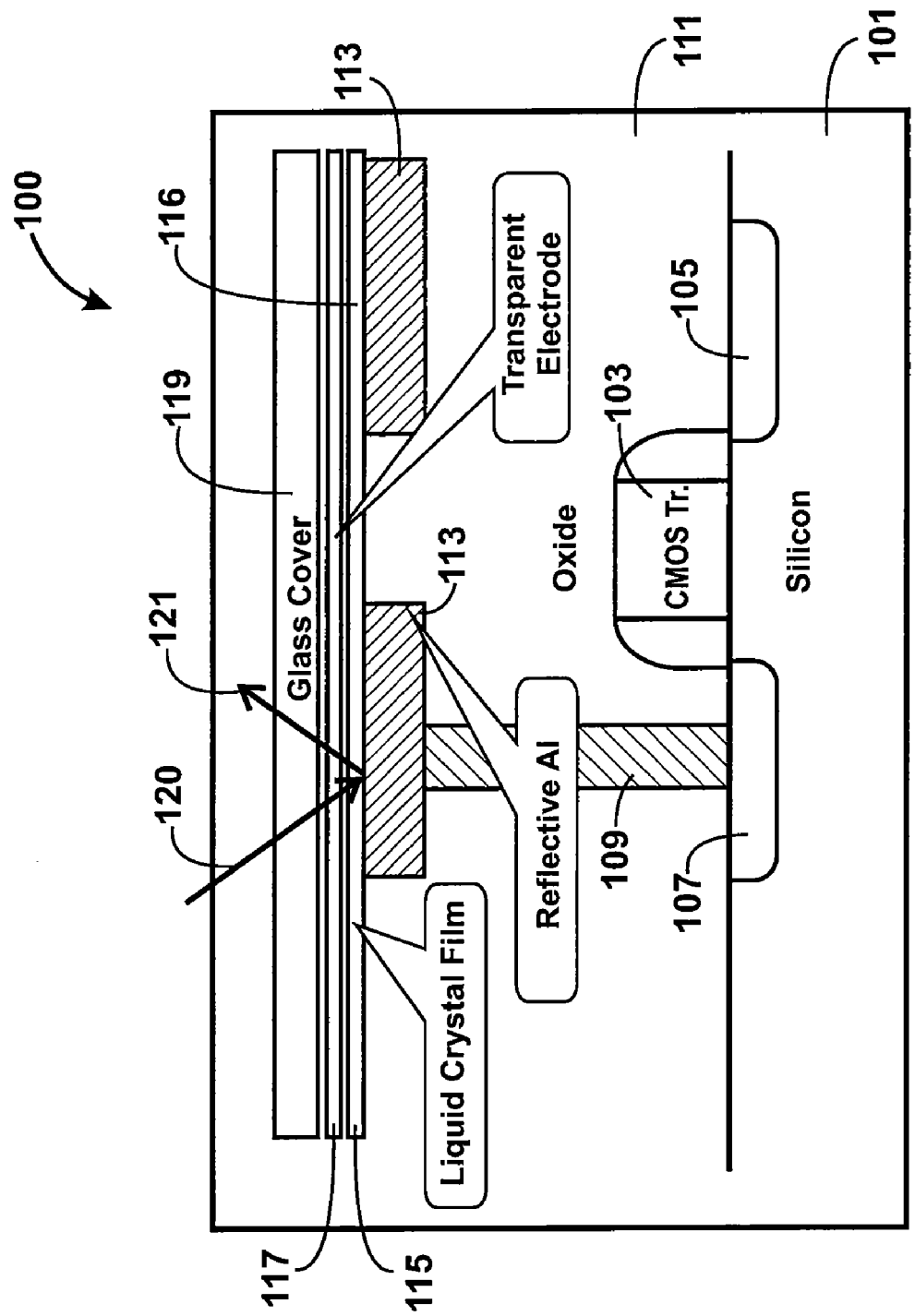
FIG. 1 is a simplified cross-sectional view diagram of an LCOS device according to an embodiment of the present invention.

FIG. 1 is a simplified cross-sectional view diagram of an LCOS device 100 according to an embodiment of the present invention. This diagram is merely an example, which should not unduly limit the scope of the claims herein. One of ordinary skill in the art would recognize many variations, alternatives, and modifications. As shown, the LCOS device 100 has a semiconductor substrate 101, e.g., silicon wafer. An MOS device layer 103 is formed overlying the semiconductor substrate. Preferably, the MOS device layer has a plurality of MOS devices. Each of the MOS devices has a contact region 107 for an electrode and a contact region 105 for a voltage potential. A planarized interlayer dielectric layer 111 is formed overlying the MOS device layer. The LCOS device also has a plurality of recessed regions within a portion of the interlayer dielectric layer and a metal layer (e.g., aluminum) to fill each of the recessed regions to form respective plurality of electrode regions 113 corresponding to each of the recessed regions. Each of the electrode regions is respectively coupled at least one of the MOS devices among the plurality of MOS devices via interconnect structure 109, which may be a plug or other like structure. A protective layer is formed overlying surface regions of each of the plurality of electrode regions to protect the surface regions. A mirror finish 116 is on each of the surface regions. Preferably, the mirror finish is substantially free from defects, and has a high degree of reflectivity and a surface roughness ≦5 Å RMS. More preferably, the chemical mechanical polishing process is a touch polishing process with certain conditions. Each of the electrodes may have a thickness ranging from about 2000 Angstroms to about 4000 Angstroms and can be at other dimensions. Each of the electrodes represents a pixel element in an array of pixel elements for the LCOS device. Also shown is liquid crystal film 115 overlying the electrodes. The LCOS device also has a transparent electrode layer (e.g., indium tin oxide) 117 and an overlying glass plate 119 to enclose the multilayered structure. Details on ways of operating the LCOS device can be found throughout the present specification and more particularly below.

In this invention, an aluminum damascene process is used, in which aluminum or aluminum alloy deposited into the trench is polished using CMP, with over border aluminum removed.

To operate the LCOS device, light 120 traverses through the glass cover, through the transparent electrode, and to the liquid crystal film. When the electrode is not biased, the liquid crystal film is essentially in the off position, which does not allow the light to pass therethrough. Rather, light is blocked and does not reflect off of the mirror surface of the electrode. When the electrode is biased via MOS device, the liquid crystal film is in an on-position, which allows light to pass 121. The light reflects off of the surface of the electrode and through the liquid crystal film, which is in an on-position. Preferably, the mirror surface is substantially free from imperfections. Accordingly, at least 93% of the incoming light passes out 121 of the LCOS device. Details on ways of fabricating the LCOS device can be found throughout the present specification and more particularly below.

A method for fabricating an electrode structure for an LCOS device according to an embodiment of the present invention may be outlined as follows:

1. Provide a substrate;
2. Form a layer of transistor elements overlying the substrate;
3. Form a first interlayer dielectric layer overlying the layer of transistor elements;
4. Pattern the interlayer dielectric layer to form a plurality of recessed regions, each of the recessed regions corresponding to a pixel element for a LCOS device, each of the recessed regions being isolated by a portion of dielectric material defining a border for each of the recessed regions, each of the border regions forming a peripheral region surrounding each recessed region;
5. Deposit an aluminum material within each of the recessed regions to fill each of the recessed regions and to cover exposed portions of the border regions;
6. Form a photomask overlying the aluminum material;
7. Pattern the photomask to expose regions corresponding to the recessed regions and protecting regions corresponding to the border regions;
8. Remove exposed regions of the aluminum material while protecting the regions corresponding to the border regions with the photomask;
9. Continue the removing until the aluminum material has been removed to a vicinity of an upper region of the border regions;
10. Strip the patterned photomask to expose protruding aluminum material, the protruding aluminum material surrounding the patterned aluminum material;
11. Touch-up polishing the protruding aluminum material and portions of the patterned aluminum material while using the border regions as a polish stop;
12. Planarize an upper surface region formed by the border regions and the patterned aluminum material; and
13. Perform other steps, as desired.

The above sequence of steps provides a method according to an embodiment of the present invention. As shown, the method uses a combination of steps including a way of forming an electrode structure for an LCOS device. Other alternatives can also be provided where steps are added, one or more steps are removed, or one or more steps are provided in a different sequence without departing from the scope of the claims herein. Further details of the present method can be found throughout the present specification and more particularly below.

Figure 2:
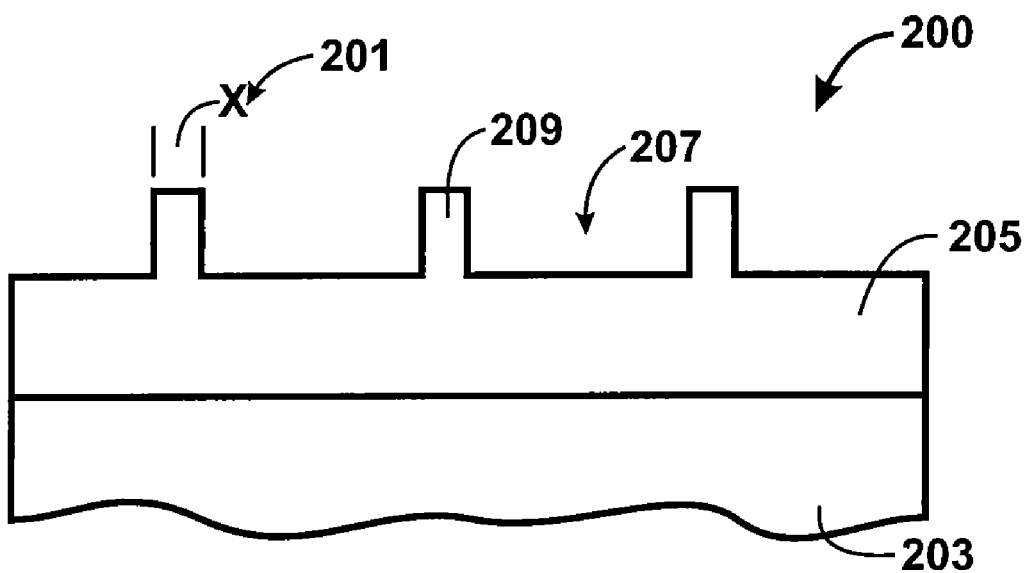
FIGS. 2 through 5 are simplified cross-sectional view diagrams illustrating methods for fabricating an LCOS device according to embodiments of the present invention
Figure 3:
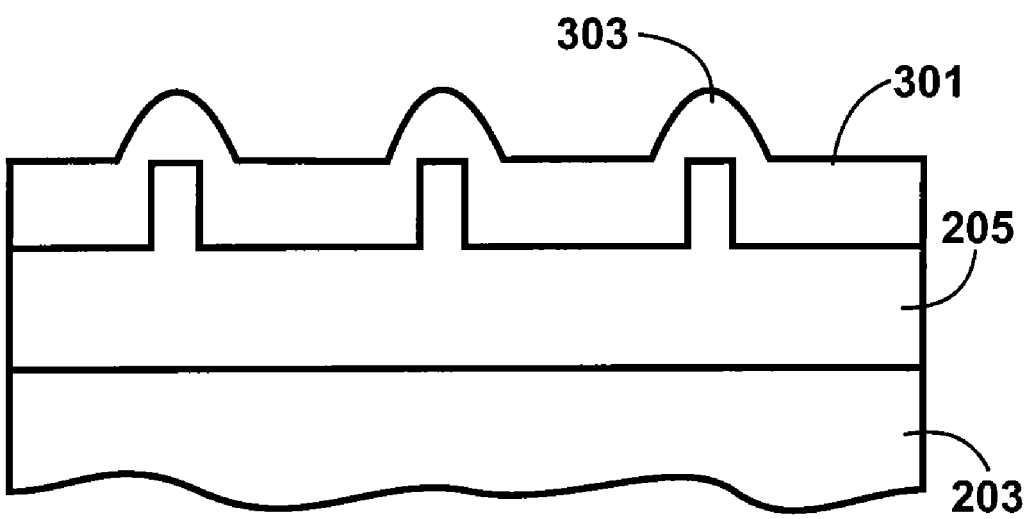
Figure 4:
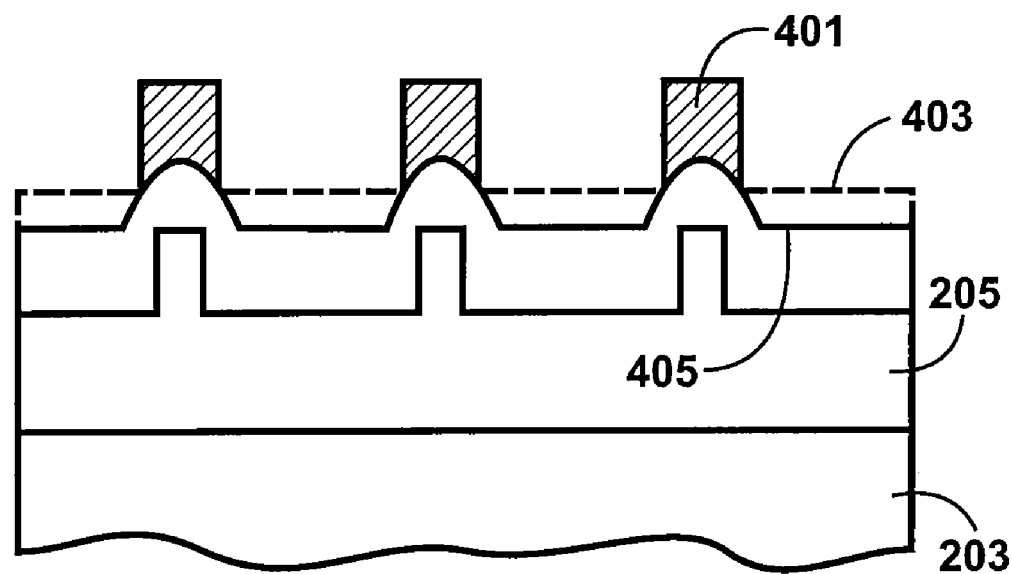
Figure 5:
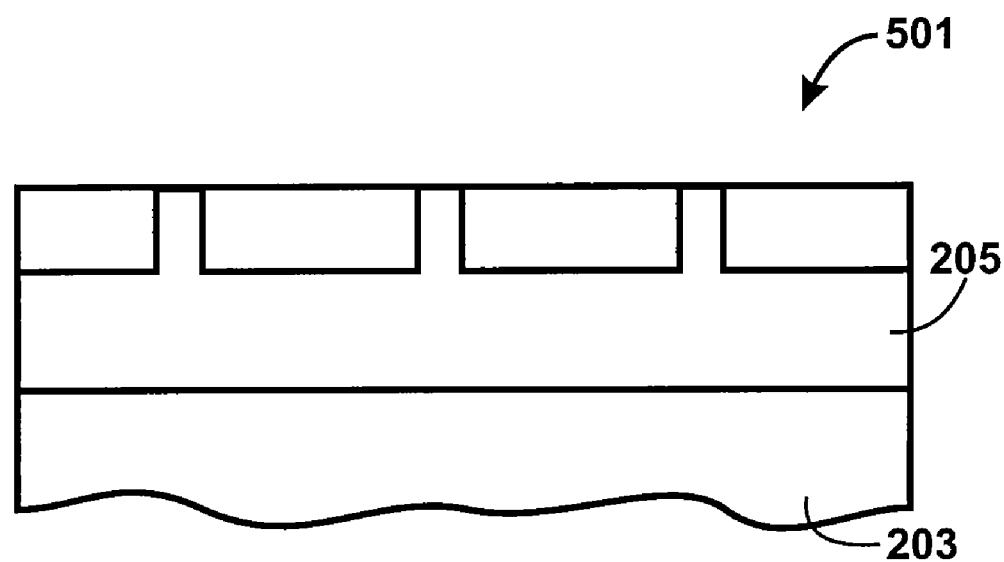

FIGS. 2 through 4 illustrate a method for forming an LCOS device according to an embodiment of the present invention.

These diagrams are merely examples, which should not unduly limit the scope of the claims herein. One of ordinary skill in the art would recognize many variations, alternatives, and modifications. Referring to FIG. 2, the method begins by providing a semiconductor substrate 203, e.g., silicon wafer. The method includes forming a transistor layer overlying the substrate. Preferably, the transistor layer has a plurality of MOS devices, each of which includes a first contact region and a second contact region. The method also includes forming an interlayer dielectric layer 205 overlying the transistor layer. The dielectric layer can be made of borophosphosilicate glass (BPSG), fluorinated silicate glass (FSG), oxide, high density plasma (HDP), and any combination of these, and the like. Preferably, the dielectric layer is formed using a chemical vapor deposition process. The method then planarizes the interlayer dielectric layer to form a planarized surface region. Optionally, the dielectric layer has already been planarized.

Referring to FIG. 2 again, the method includes masking the upper surface of the interlayer dielectric. The method patterns the interlayer dielectric to form recessed regions 207. Each of the recessed regions is separated by border region 209. Each of the border regions is less than a predetermined measurement 201. Preferably, the predetermined measurement is less than 1 micron, but can be others. Each of the recessed regions has a depth of 0.1 μm to 1.5 μm and width of about 2 microns and greater depending upon the embodiment.

Referring to FIG. 3, the method includes forming a barrier metal layer (not shown) overlying the recessed regions and border regions. The barrier metal layer can be made from any suitable material such as titanium nitride, titanium/titanium nitride, and the like. The method includes forming a metal layer (e.g., aluminum) 301 overlying the barrier metal layer. The metal layer such as aluminum is sputtered. The metal layer has a surface that is substantially planar but has certain defects such as surface roughness and other imperfections. In a specific embodiment, the metal layer has a predetermined roughness of 20 and greater using a sputtering process. Each of the electrode regions is respectively coupled to each of the MOS devices among the plurality of MOS devices. As shown, the aluminum layer is slightly higher 303 over the border regions. Of course, one of ordinary skill in the art would recognize other variations, modifications, and alternatives.

In a specific embodiment, the method forms a patterned photomask over selected regions of the aluminum layer. Referring to FIG. 4, the method forms a photomask overlying the aluminum material and patterns 401 the photomask to expose regions corresponding to the recessed regions and protects regions corresponding to the border regions. The method removes exposed regions of the aluminum material while protecting the regions corresponding to the border regions with the photomask. Preferably, the method uses wet or dry etching techniques. In a specific embodiment, the method uses a dry etch process. The etching technique continues the removing until the aluminum material has been removed to a vicinity 405 of an upper region of the border regions. Here, the upper region of the border region is within 1000 Angstroms of the etched surface 405. Preferably, the etched surface is slightly higher from the upper region by about 500 Å according to a specific embodiment. Regions corresponding to those that were protected using the photomask are higher than the etched surface, as shown.

According to a specific embodiment, the method then performs a chemical mechanical planarization process 501 to remove the higher or protruding regions of the aluminum material and to planarize the aluminum layer with the upper surface of the border region here, the method strips the patterned photomask to expose protruding aluminum material, which surrounds the patterned aluminum material. The method touch polishes the protruding aluminum material and portions of the patterned aluminum material while using the border regions as a polish stop to planarize an upper surface region formed by the border regions and the patterned aluminum material. A down force of 1 to 3 psi and plate speed of 20-70 RPM according to a specific embodiment.

The method also includes forming a protective layer overlying surface regions of each of the plurality of electrode regions to protect the surface regions having a mirror finish for each of the electrode regions. Preferably, at least 91% of the light is reflected back from the mirror finish in completed LCOS devices. The protective layer can be formed by treating the surface of the bare aluminum layer with an oxidizing fluid such as hydrogen peroxide, BTA, ozone/water mixtures, and the like. The oxidizing fluid is substantially clean and forms a passivation layer overlying the bare aluminum layer. Depending upon the embodiment, there can be other variations, modifications, and alternatives.

To complete the LCOS device, the method forms a sandwiched layer having liquid crystal materials. Here, a liquid crystal film is formed overlying the electrodes. A transparent electrode structure is formed overlying the liquid crystal film. The method forms a glass plate overlying the transparent electrode. The sandwiched structure is often formed as an assembly, which is later disposed onto surfaces of the electrodes of the LCOS devices. Of course, one of ordinary skill in the art would recognize many variations, alternatives, and modifications.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for fabricating a liquid crystal on silicon ("LCOS") device, the method comprising:
   providing a silicon substrate having a surface region;
   forming an interlayer dielectric layer overlying the surface region of the substrate;
   patterning the interlayer dielectric layer to form a plurality of recessed regions, each of the recessed regions corresponding to a pixel element for a LCOS device, each of the recessed regions being isolated by a portion of dielectric material defining a border for each of the recessed regions, each of the border regions forming a peripheral region surrounding each recessed region;
   depositing an aluminum material or aluminum alloy material within each of the recessed regions to fill each of the recessed regions and to cover exposed portions of the border regions;
   forming a photomask overlying the aluminum material;
   patterning the photomask to expose regions corresponding to the recessed regions and protecting regions corresponding to the border regions;
   removing exposed regions of the aluminum material using an etching process while protecting the regions corresponding to the border regions with the photomask;
   continuing the removing using the etching process until the aluminum material has been removed to a vicinity of an upper region of the border regions;
   stripping the patterned photomask to expose protruding aluminum material, the protruding aluminum material surrounding the patterned aluminum material; and touch-up polishing the protruding aluminum material and portions of the patterned aluminum material while using the border regions as a polish stop to planarize an upper surface region formed by the border regions and the patterned aluminum material;

whereupon each of the border regions being characterized by a thickness of about 1 micron and less.

2. The method of claim 1 wherein the aluminum or aluminum alloy is sputtered.

3. The method of claim 1 wherein the vicinity of the upper region of the border region is about 500 to 1000 Angstroms from a top surface of the border region.

4. The method of claim 1 wherein the border regions comprise a width of 0.1 micron to about 2 microns.

5. The method of claim 1 wherein each of the border regions comprise a height of 0.1 microns to about 1.5 microns.

6. The method of claim 1 further comprising touch-up polishing the patterned aluminum to form a mirror finish on each portion of patterned aluminum within the border region.

7. The method of claim 1 wherein the interlayer dielectric layer is selected from at least one of doped oxide, undoped oxide, BPSG, PSG, and HDP oxide.

8. The method of claim 1 further comprising exposing the border regions while maintaining the patterned aluminum material.

9. The method of claim 1 wherein the border regions is characterized by a width of less than 1 micron.

10. The method of claim 1 wherein the touch-up polishing substantially prevents any dishing or scratching on the patterned aluminum, and enhances aluminum surface reflectivity and reduces surface roughness.

11. A method for fabricating a liquid crystal on silicon ("LCOS") device, the method comprising:

providing a substrate having a surface region;

forming an interlayer dielectric layer overlying the surface region of the substrate;

patterning the interlayer dielectric layer to form a plurality of recessed regions, each of the recessed regions corresponding to a pixel element for a LCOS device, each of the recessed regions being isolated by a portion of dielectric material defining a border for each of the recessed regions, each of the border regions forming a peripheral region surrounding each recessed region;

depositing an aluminum material within each of the recessed regions to fill each of the recessed regions and to cover exposed portions of the border regions;

forming a photomask overlying the aluminum material;

patterning the photomask to expose regions corresponding to the recessed regions and protecting regions corresponding to the border regions;

removing exposed regions of the aluminum material while protecting the regions corresponding to the border regions with the photomask;

continuing the removing until the aluminum material has been removed to a vicinity of an upper region of the border regions;

stripping the patterned photomask to expose protruding aluminum material, the protruding aluminum material surrounding the patterned aluminum material; and touch-up polishing the protruding aluminum material and portions of the patterned aluminum material while using the border regions as a polish stop to planarize an upper surface region formed by the border regions and the patterned aluminum material.

12. The method of claim 11 wherein the aluminum or aluminum alloy is sputtered.

13. The method of claim 11 wherein the vicinity of the upper region of the border region is about 500 to 1000 Angstroms from a top surface of the border region.

14. The method of claim 11 wherein the border regions comprise a width of 0.1 micron to about 2 microns.

15. The method of claim 11 wherein each of the border regions comprise a height of 0.1 microns to about 1.5 microns.

16. The method of claim 11 further comprising touch-up polishing the patterned aluminum to form a mirror finish on each portion of patterned aluminum within the border region.

17. The method of claim 11 wherein the interlayer dielectric layer is selected from at least one of doped oxide, undoped oxide, BPSG, PSG, and HDP oxide.

18. The method of claim 11 further comprising exposing the border regions while maintaining the patterned aluminum material.

19. The method of claim 11 wherein the border regions is characterized by a width less than 1 micron.

20. The method of claim 11 wherein the touch-up polishing substantially prevents any dishing or scratching on the patterned aluminum.

* * * * *